United States Patent Office 3,446,585
Patented May 27, 1969

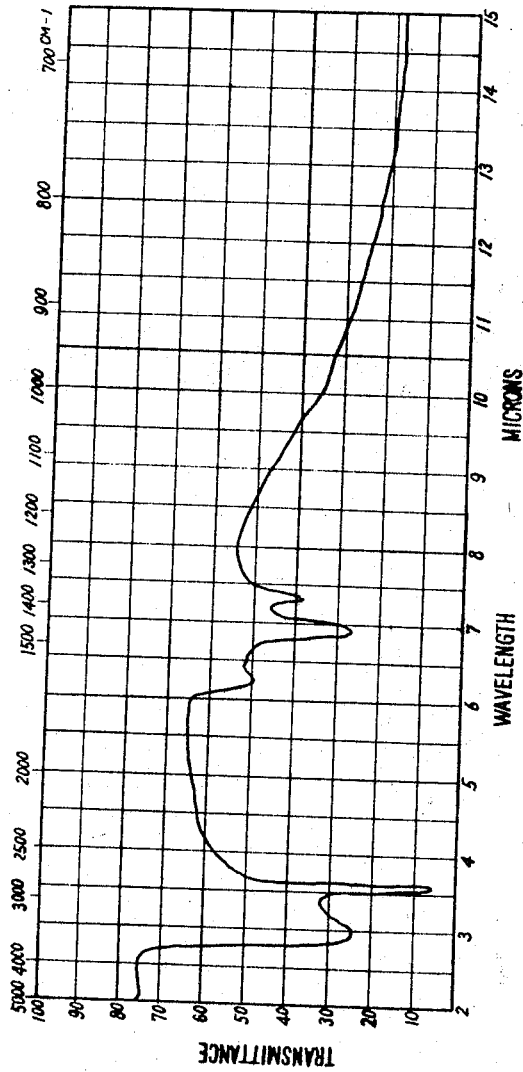

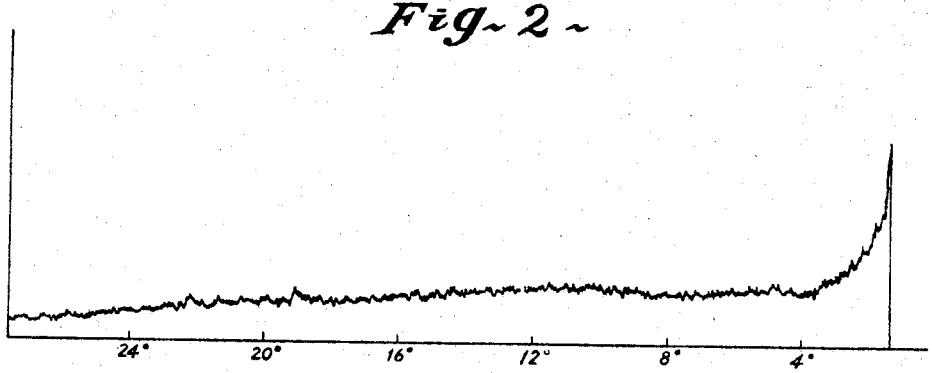
Fig-2-
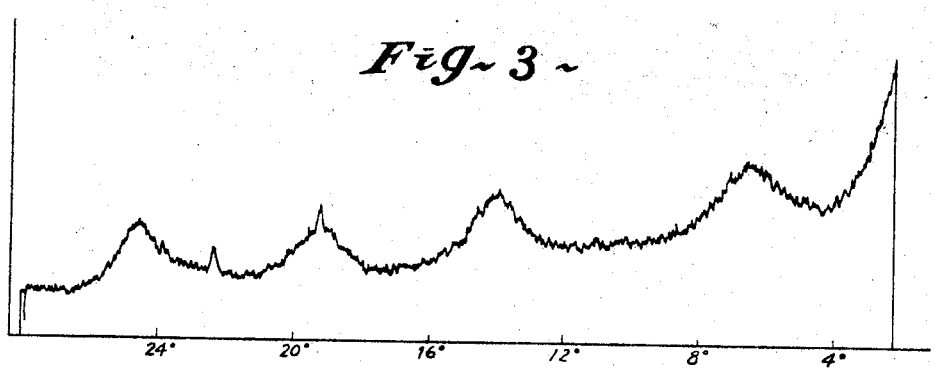
Fig-3-
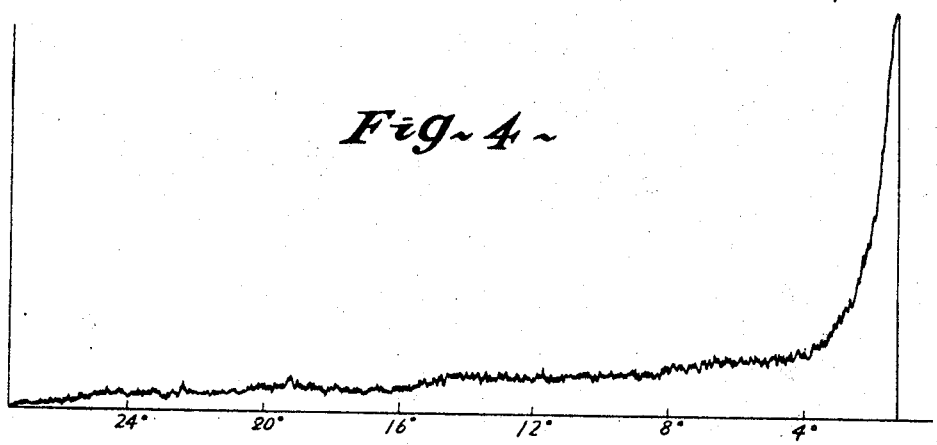
Fig-4-

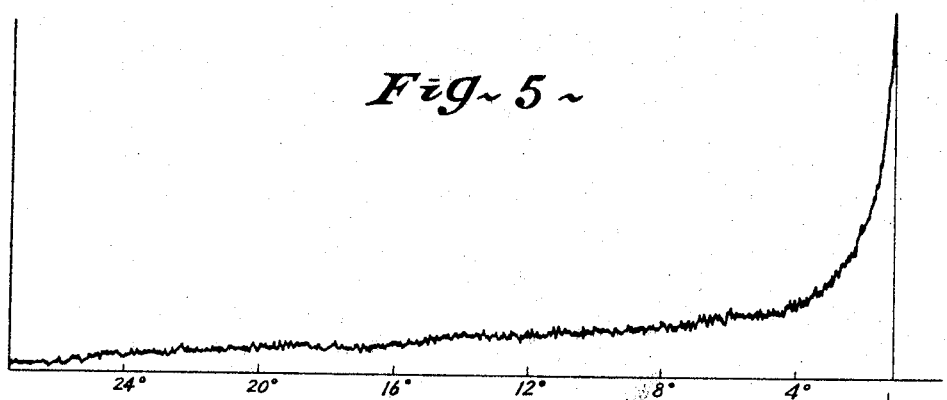
Fig-5-
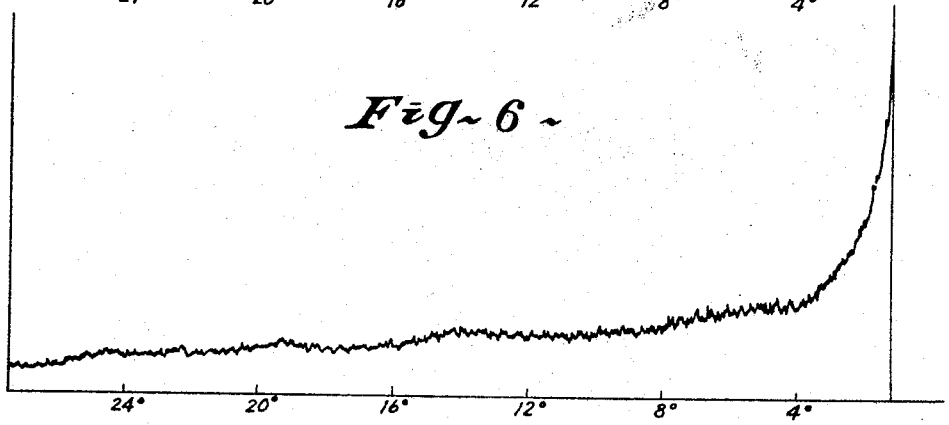
Fig-6-
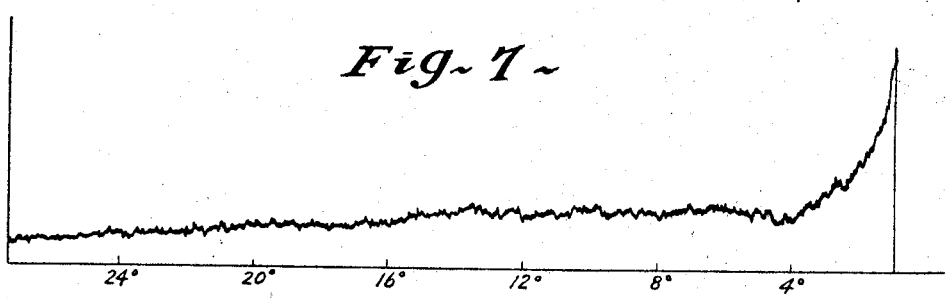
Fig-7-
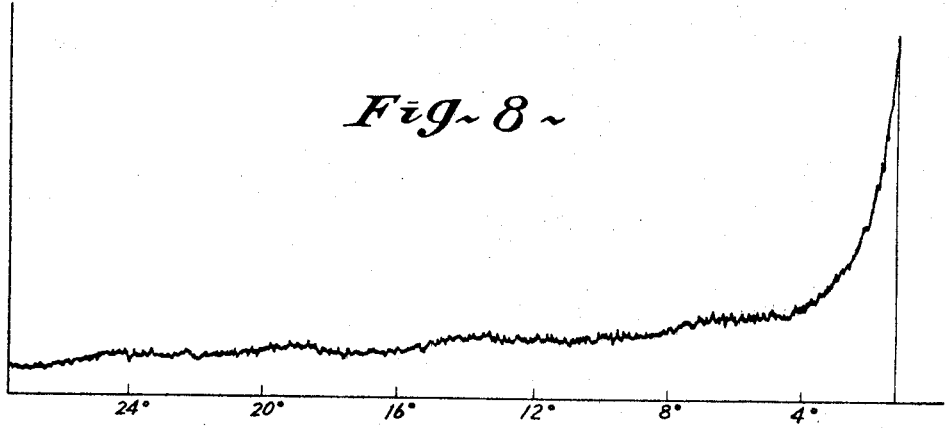
Fig-8-

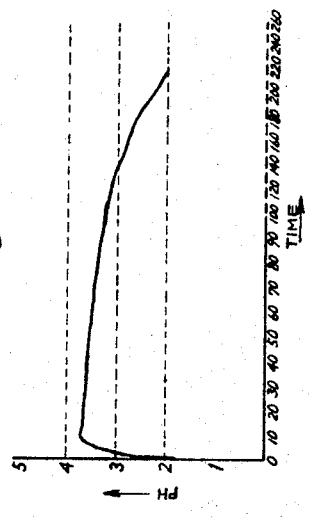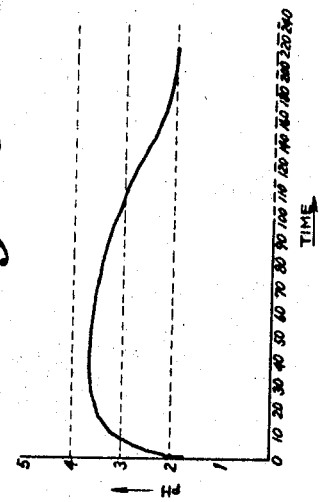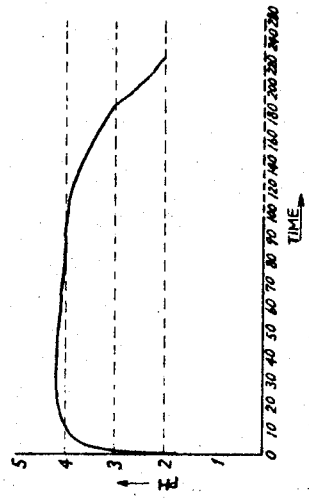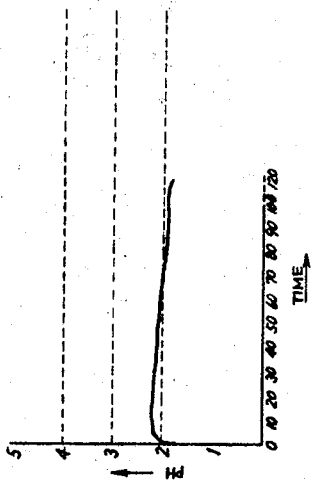

3,446,585
ALUMINUM COMPOUNDS AND THE
PREPARATION THEREOF
Hideo Tanabe, Nishinomiya, Japan, assignor to Takeda Chemical Industries, Ltd., Osaka, Japan
Original application Oct. 7, 1963, Ser. No. 314,339, now Patent No. 3,401,223, dated Sept. 10, 1968. Divided and this application Oct. 10, 1967, Ser. No. 698,364
Claims priority, application Japan, Oct. 9, 1962, 37/45,091
Int. Cl. C01f 7/02; A61k 27/00
U.S. Cl. 23—143                                                6 Claims

ABSTRACT OF THE DISCLOSURE

Aluminum compound wherein aluminum hydroxide is chemically combined with dibasic lower aliphatic carboxylic acid or with the hydroxy carboxylic acid (malic acid, salicylic acid, lactic acid, tartaric acid, citric acid, gluconic acid, ketogluconic acid) in a ratio (from 1/10 to 1/50 mole of the acid per atom of aluminum) sufficient to prevent the aging of the aluminum hydroxide. Such compound is useful as antacid in relieving gastric acidity.

---

This application is a division of copending application Ser. No. 314,339, filed Oct. 7, 1963 and now U.S. Patent No. 3,401,223.

This invention relates to novel aluminum compounds and to a method for preparing the same. More particularly, this invention relates to aluminum compounds wherein aluminum hydroxide is combined with an acid selected from the group consisting of dibasic lower aliphatic carboxylic acid and hydroxy carboxylic acid in such a ratio as is sufficient for preventing the aging of the aluminum hydroxide and as essentially eliminates undesirable effect upon control of the acidity of gastric juice, and to a method for preparing the same which comprises reacting aluminum hydroxide with an acid selected from the group consisting of dibasic lower aliphatic carboxylic acid and hydroxy carboxylic acid in the presence of water, followed by drying.

Amorphous aluminum hydroxide has widely been used as a gastric antacid, while medicinal merit is hardly found in crystalline aluminum hydroxide, because the latter hardly reacts with a weak acid such as gastric juice. Though aluminum hydroxide keeps its amorphous state for a while just after its preparation, it is converted into crystalline form with the lapse of time in the presence of water at room temperature. Therefore, hitherto employed medicinal preparations containing aluminum hydroxide suffer a reduction in their effect for controlling the acidity of gastric juice, during storage.

The present invention overcomes this difficulty by providing aluminum compounds wherein aluminum hydroxide is combined with dibasic lower aliphatic carboxylic acid or hydroxy carboxylic acid in certain ratios so that they do not at all or only barely crystallize even when they are kept standing under conditions such that would cause amorphous aluminum hydroxide to crystallize, the so-prepared aluminum compound having a strong effect upon controlling acidity of gastric juice like amorphous aluminum hydroxide, such effect being not at all or hardly weakened with the lapse of time. Further, the aluminum compounds according to the invention have no substantial toxicity.

An object of this invention is thus to obtain aluminum compounds wherein aluminum hydroxide is combined with dibasic lower aliphatic carboxylic acid or hydroxy carboxylic acid in such a ratio as is sufficient for preventing the aging of aluminum hydroxide and for essentially entirely avoiding any undesirable effect upon controlling the acidity of gastric juice. Another object is to provide a method for preparing the same.

FIG. 1 of the accompanying drawings shows an infrared spectrum of an aluminum compound wherein aluminum hydroxide is combined with gluconic acid in a molar ratio of 1:0.06. Like the aluminum compound, any compounds of this invention have their absorption band at 1610–1550 cm.$^{-1}$ due to carboxylate ion, but have no absorption band at 1710 cm.$^{-1}$ due to free carboxylic acid, which shows that an acid selected from the group consisting of dibasic lower aliphatic carboxylic acid and hydroxy carboxylic acid is combined with aluminum hydroxide in the aluminum compounds of this invention to form novel compounds chemically combining the aluminum hydroxide with the acid, but does not form a mere mixture of aluminum hydroxide and the acid.

FIG. 2 shows X-ray diffraction of amorphous aluminum hydroxide.

FIG. 3 shows X-ray diffraction of crystalline aluminum hydroxide obtained by heating amorphous aluminum hydroxide in the presence of water. The treatment is carried out as follows: A sample is dispersed in 10 times its volume of water, then is heated at 100° C. for 30 minutes, followed by drying at 100° C.

FIGS 4–11 show the respective X-ray diffractions of aluminum compounds of this invention which are treated as mentioned above. Aluminum compounds in the respective figures are as follows:

FIG. 4: Aluminum compound wherein aluminum hydroxide is combined with lactic acid in the ratio of 0.08 mole of the acid relative to 1 atom of aluminum.

FIG. 5: Aluminum compound wherein aluminum hydroxide is combined with gluconic acid in the ratio of 0.04 mole of the acid relative to 1 atom of aluminum.

FIG. 6: Aluminum compound wherein aluminum hydroxide is combined with citric acid in the ratio of 0.02 mole of the acid relative to 1 atom of aluminum.

FIG. 7: Aluminum compound wherein aluminum hydroxide is combined with tartaric acid in the ratio of 0.026 mole of the acid relative to 1 atom of aluminum.

FIG. 8: Aluminum compound wherein aluminum hydroxide is combined with salicylic acid in the ratio of 0.028 mole of the acid relative to 1 atom of aluminum.

Figure 9:
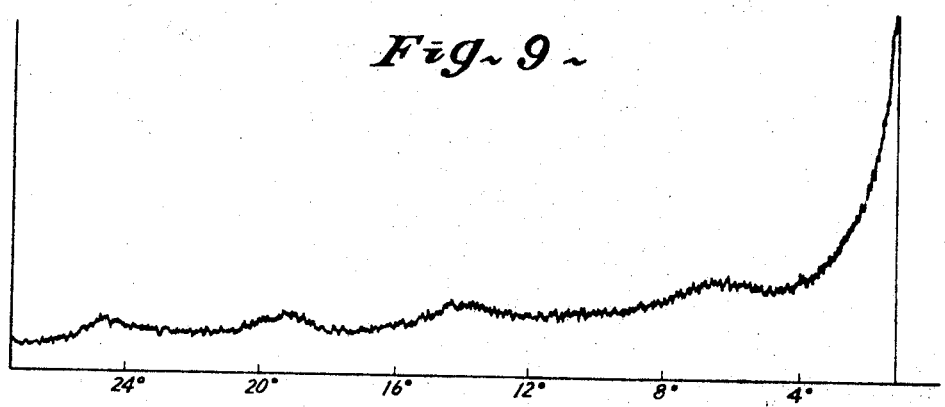

FIG. 9: Aluminum compound wherein aluminum hydroxide is combined with malonic acid at the ratio of 0.038 mole of the acid relative to 1 atom of aluminum.

Figure 10:
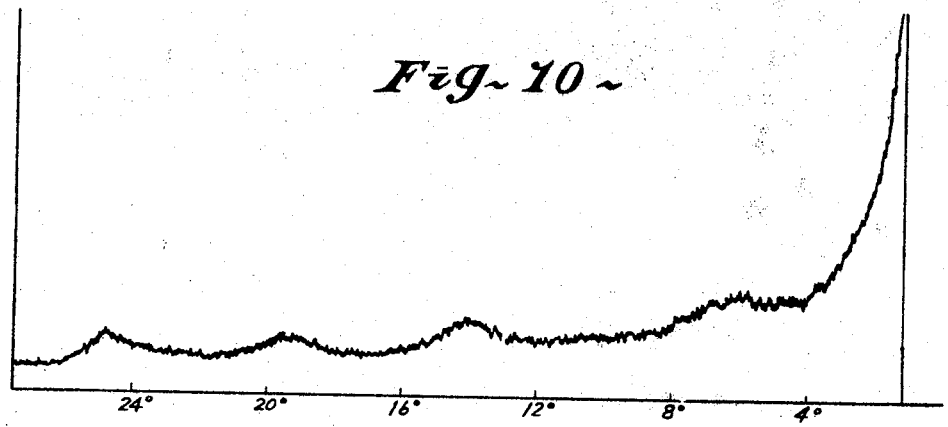

FIG. 10: Aluminum compound wherein aluminum hydroxide is combined with maleic acid at the ratio of 0.033 mole of the acid relative to 1 atom of aluminum.

Figure 11:
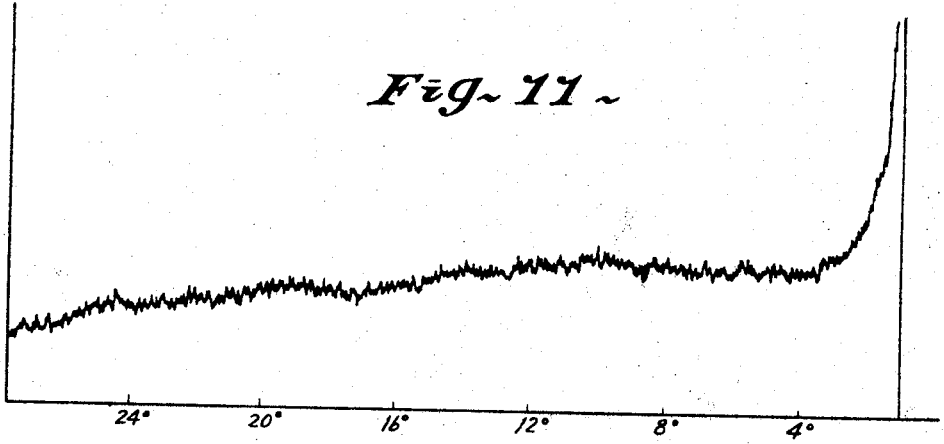

FIG. 11: Aluminum compound wherein aluminum hydroxide is combined with malic acid at the ratio of 0.04 mole of the acid relative to 1 atom of aluminum.

As is shown in these figures, while X-ray diffraction patterns are observed in FIG. 3, no such pattern appears in FIGS. 2 and 4 to 10, from which it is clear that the aluminum compounds of this invention are not converted into crystals but are kept in amorphous state even when subjected to conditions under which amorphous aluminum hydroxide crystallizes. Aluminum compounds of this invention retain their solubility in an acid for a relatively long time, while aluminum hydroxide, which is acid soluble right after its preparation, is converted into difficultly acid-soluble form with the lapse of time.

As a dibasic lower aliphatic carboxylic acid, which is combined with aluminum hydroxide to form the aluminum compound of this invention, there may be employed unsaturated carboxylic acid as well as saturated carboxylic acid. The number of carbons of the lower ali-

TABLE II

| Ratio of the acid (mole) relative to aluminum hydroxide | Before treatment[1] | 10 hours after treatment[1] | 30 hours after treatment[1] | 50 hours after treatment[1] |
|---|---|---|---|---|
| Control | 310 | 276 (11%) | 185 (41%) | 115 (63%) |
| 1 atom aluminum:0.044 g | 295 | 295 (0%) | 295 (0%) | 295 (0%) |
| 1 atom aluminum:0.018 g | 312 | 294 (6%) | 277 (11%) | 260 (17%) |
| 1 atom aluminum:0.04 c | 300 | 301 (0%) | 300 (0%) | 300 (0%) |
| 1 atom aluminum:0.018 c | 283 | 265 (6%) | 245 (14%) | 240 (16%) |

[1] The manner of the treatment is the same as explained in connection with Table I.
Figures in parentheses show the lowering rate of the effect.
NOTE.—g., Gluconic acid; c., citric acid.

phatic carboxylic acid is preferably up to 4. For example, there may be used maleic acid, malonic acid, succinic acid, tartaric acid, etc. As a hydroxy carboxylic acid to be employed in place of a dibasic lower aliphatic carboxylic acid, aromatic acid as well as aliphatic acid is employed. When the hydroxy carboxylic acid is aliphatic acid, unsaturated acid as well as saturated acid having a carbon number up to 6 is employed. They may or may not have substituents such as carbonyl group. As the hydroxy carboxylic acid, there may, for example, be used malic acid, lactic acid, tartaric acid, citric acid, gluconic acid, salicylic acid, etc.

The amount of the acid combining with aluminum hydroxide may be varied according to the kind of acid. Aluminum compounds of this invention wherein an excess amount of an acid is combined with aluminum hydroxide lower the effect upon controlling acidity of gastric juice. On the contrary, aluminum compounds of this invention wherein too small an amount of acid is combined with aluminum hydroxide, cannot sufficiently prevent aging. Generally, the ratio of about 1/10–1/50 mole acid relative to one atom of aluminum is most preferable.

Aluminum compounds of this invention have strong effect upon controlling acidity of gastric juice. The activity is not at all or only extremely slightly lowered with the lapse of time.

Table I shows the result of examination of the effect upon controlling acidity of gastric juice carried out in accordance with the prescription for the test of the effect upon controlling acidity in Japanese Pharmacopeia VI, keeping each sample at a condition that aluminum hydroxide is converted into crystals, i.e. heating a solution prepared by dissolving 1 gram of aluminum hydroxide in 10 grams of water at 100° C. for 30 minutes. The effect upon controlling acidity of gastric juice is shown in terms of the volume of 0.1 N HCl with which 1 gram of the sample may react at 37° C. for 1 hour with an excess of acid present. Residual amount of the acid is determined by back titration with 0.1 N NaOH.

TABLE I

| Acid which is combined with aluminum hydroxide | The effect for controlling acidity of gastric juice | The ratio of the acid relative to aluminum hydroxide |
|---|---|---|
| Gluconic acid | 305 | 1 atom Al:0.056 mole acid. |
| Do | 298 | 1 atom Al:0.044 mole acid. |
| Do | 213 | 1 atom Al:0.028 mole acid. |
| Citric acid | 255 | 1 atom Al:0.06 mole acid. |
| Do | 243 | 1 atom Al:0.03 mole acid. |
| Do | 215 | 1 atom Al:0.02 mole acid. |
| Tartaric acid | 291 | 1 atom Al:0.05 mole acid. |
| Malonic acid | 213 | 1 atom Al:0.038 mole acid. |
| Maleic acid | 190 | 1 atom Al:0.033 mole acid. |
| Salicylic acid | 260 | 1 atom Al:0.028 mole acid. |
| Malic acid | 260 | 1 atom Al:0.08 mole acid. |
| None (control) | 52 | 1 atom Al:0 mole acid. |

As is shown in Table I, the effect of the aluminum compound of this invention is about 4 to 6 times of that of the control.

Table II shows the effect upon controlling acidity determined by keeping each sample in a weather meter where the temperature and humidity are 40° C. and 100%, respectively.

As is shown in Table II, while the effect is lowered to less than half after 50 hour treatment in control, only slight or no lowering of the effect is observed in the aluminum compound of this invention.

FIGS. 12–15 show the pH measured by a modification of S. M. Beekman's method which is popularly employed for examining the effect upon controlling acidity. The method is as follows:

A definite amount of sample (antacid) is added to an acid solution having a constant pH, followed by keeping at 37° C. Then additional portions of the acid solution are added to the mixture solution every ten minutes with stirring at 37° C. pH of the mixture solution is measured at every interval of a definite time. The reaction system is kept at constant volume by allowing an excess amount of the mixture of acid solution and sample to flow out. The effect upon controlling acidity of the sample can be estimated from the length of period where pH is kept at such range as 3 to 4.5. The samples used in the respective figures are:

FIG. 12: dried aluminum hydroxide (amorphous);
FIG. 13: dried aluminum hydroxide which is treated as mentioned before (crystals);
FIG. 14: aluminum compound wherein aluminum hydroxide is combined with gluconic acid in the ratio of 0.04 mole of the acid relative to 1 atom aluminum; and
FIG. 15: aluminum compound having the same constituents as above, but is treated as mentioned before.

As is shown in these figures, the pH of an acid solution to which crystalline aluminum hydroxide is added, is not higher than 3, while in the case of adding any of the aluminum compounds of this invention the desired pH 3–4.5 may be kept for a relatively long time.

"No substantial toxicity" of the aluminum compounds of this invention is confirmed by the following test:

TOXICITY TEST

Sample (1) Aluminum compound wherein aluminum hydroxide is combined with 5-keto-gluconic acid in the ratio of 1/25 mole of the acid relative to 1 atom of aluminum.

(2) Aluminum compound wherein aluminum hydroxide is combined with 2-keto-gluconic acid in the ratio of 1/25 mole of the acid relative to one atom of aluminum.

(3) Aluminum compound wherein aluminum hydroxide is combined with gluconic acid in the ratio of 1/25 mole of the acid relative to one atom of aluminum.

(4) Aluminum compound wherein aluminum hydroxide is combined with lactic acid in the ratio of 1/15 mole of the acid relative to one atom of aluminum.

10 grams/kg. of the respective samples are administered orally to mice of 4 weeks after their birth (female, strain $CF_1$). 7 days after the administration, the condition of the mice is observed. No abnormal condition nor change appears in any mouse.

The method of this invention comprises, as described before, allowing aluminum hydroxide to react with dibasic lower aliphatic carboxylic acid or hydroxy carboxylic acid in a ratio sufficient for the prevention of aging of aluminum hydroxide and further to hardly alter, if at all, the effect upon controlling acidity of gastric juice in the presence of water, followed by drying.

The amount of the acid employed in this invention may be changed depending on the kind of acid used. To employ excess amount of the acid lowers the effect for controlling acidity of gastric juice, while the use of too small an amount of the acid cannot prevent aging of aluminum hydroxide sufficiently. Generally it may be most preferable to employ about 1/10–1/50 mole of acid relative to one mole of aluminum hydroxide.

The method of this invention can generally be carried out by adding dibasic lower aliphatic carboxylic acid or hydroxy carboxylic acid to aluminum hydroxide. However, if necessary, it may also be carried out by adding beforehand dibasic lower aliphatic carboxylic acid or hydroxy carboxylic acid to a starting material for the preparation of aluminum hydroxide, then with or without further addition of the acid, subjecting the thus-prepared aluminum hydroxide to reaction with the acid. The reaction of the method of this invention is preferably carried out with stirring at ordinary temperature.

In the method of this invention water is added so that the acid employed in a small amount relative to that of aluminum hydroxide may react uniformly with the aluminum hydroxide.

Thus prepared aluminum compound of this invention should be subjected to drying so as to remove water completely. Drying is preferably carried out at a higher temperature, e.g. 100° C. However, when relatively much water exists in the reaction system, drying at a higher temperature may cause aging slightly. In such a case as this, drying may be carried out stepwise, i.e. at a relatively low temperature, e.g. 50–80° C. for a short time, then at about 100° C., as described in the foregoing.

As is commonly known, when aluminum hydroxide is allowed to react with 1–3 moles of acid, normal or basic salt is prepared. Such salts are water soluble, while the aluminum compounds of this invention are sparingly soluble in water.

On the other hand, aluminum compounds of this invention are not contaminated with such salt, which can be confirmed by washing them with water with no decrease of their volume, because any salt which is present will be washed away with water, causeing a decrease of the corresponding volume.

The following examples are given for the purpose of illustrating presently preferred embodiments of this invention, although they are not intended to constitute a restriction or limitation of the scope of this invention. And it should be understood that any variation of the method substantially described in the foregoing description as well as in the appended claims is encompassed in the scope of this invention. In the examples, the relationship between part by weight and part by volume is the same as that between gram and milliliter, and the effect upon controlling acidity is measured by the prescription in Japanese Pharmacopeia VI, mentioned hereinbefore. Gastric acidity cn be relieved by the administration of aluminum compounds of this invention, the effective dosage of which is generally 0.02–0.1 gram/kilogram per day.

EXAMPLE 1

To a solution prepared by dissolving 7 parts by weight of sodium hydrogen carbonate in 80 parts by volume of water is added with stirring a solution of 11.86 parts by weight of alum in 50 parts by volume of water, whereupon aluminum hydroxide precipitates out. The precipitate separated by filtration is washed with water, to which precipitate is added with stirring 3.4 parts by volume of 10% aqueous solution of gluconic acid so that a homogeneous mixture is formed, followed by pre-drying the mixture at 80° C. for 10 minutes at the longest and then by further drying at 100° C. for 30 minutes, whereupon there are obtained 2.3 parts by weight of the desired product having 0.07 molar ratio of gluconic acid relative to aluminum.

Yield: 2.3 parts by weight.
Anti-acid potency of the product is 316.

EXAMPLE 2

To aluminum hydroxide obtained as in Example 1 is added 1.7 parts by volume of 10% aqueous solution of gluconic acid and treated as in Example 1 to obtain aluminum compound wherein aluminum hydroxide is combined with gluconic acid at the ratio of 0.035 mole of the acid relative to 1 atom of aluminum.

Yield: 2.1 parts by weight.
Anti-acid potency of the product is 333.

EXAMPLE 3

To a solution prepared by dissolving 11.86 parts by weight of alum in 50 parts by volume of water is added 3.78 parts by volume of 10% aqueous solution of tartaric acid, which is added with stirring to a solution of 7 parts by weight of sodium hydrogen carbonate in 80 parts by volume of water to obtain a precipitate. After being washed with water, the precipitate is treated in the same way as in Example 1 to obtain aluminum compound wherein aluminum hydroxide is combined with tartaric acid in the ratio of 0.1 mole of the acid relative to 1 atom of aluminum.

Yield: 2.3 parts by weight.
Anti-acid potency of the product is 280.

EXAMPLE 4

To a solution prepared by dissolving 11.86 parts by weight of alum in 50 parts by volume of water is added 1.89 parts by volume of 10% aqueous solution of tartaric acid, and the resulting solution is treated in the same way as in Example 3 to obtain aluminum compound wherein aluminum hydroxide is combined with tartaric acid in the ratio of 0.05 mole of the acid relative to 1 atom of aluminum.

Yield: 2.1 parts by weight.
Anti-acid potency of the product is 305.

EXAMPLE 5

To a solution prepared by dissolving 11.86 parts by weight of alum in 50 parts by volume of water is added 2.5 parts by volume of 10% aqueous solution of gluconic acid, which is added to a solution of 7 parts by weight of potassium hydrogen carbonate, followed by heating at 70–80° C. for 30 minutes. Then after being washed with water, the precipitate is dried in the same way as in Example 1 to obtain aluminum compound wherein aluminum hydroxide is combined with gluconic acid in the ratio of 0.05 mole of the acid relative to 1 atom of aluminum.

Yield: 2.2 parts by weight.
Anti-acid potency of the product is 302.

EXAMPLE 6

The same treatment as in Example 5 is carried out, employing 3.78 parts by volume of 10% aqueous solution of tartaric acid in place of gluconic acid solution in Example 5 to obtain aluminum compound wherein aluminum hydroxide is combined with tartaric acid in the ratio of 0.1 mole of the acid relative to one atom of aluminum.

Yield: 2.3 parts by weight.
Anti-acid potency of the product is 290.

EXAMPLE 7

5.1 parts by volume of 10% aqueous solution of gluconic acid is mixed well with 10 parts by weight of aluminum hydroxide paste (which corresponds to 3.5 parts of aluminum hydroxide when it is dried at 100° C.) which is obtained by adding an alkaline solution to basic aluminum sulfate, followed by drying at 80° C. within 10 minutes and then by further drying at 100° C. for 30 minutes, whereupon there is obtained aluminum compound wherein aluminum hydroxide is combined with gluconic acid in the ratio of 0.058 mole of the acid relative to one atom of aluminum.

Yield: 4 parts by weight.
Anti-acid potency of the product is 304.

EXAMPLE 8

Paste of 10 parts by weight of aluminum hydroxide obtained in the same way as in Example 7 is mixed with 2.25 parts by volume of 10% aqueous solution of gluconic acid, and the resultant paste is treated in the same way as in Example 7 to obtain aluminum compound wherein aluminum hydroxide is combined with gluconic acid in the ratio of 0.026 mole of the acid relative to one atom of aluminum.

Yield: 3.7 parts by weight.
Anti-acid potency of the product is 310.

EXAMPLE 9

Paste of 10 parts by weight of aluminum hydroxide obtained in the same way as in Example 7 is mixed with 3 parts by volume of 10% aqueous solution of citric acid, and the resultant paste is treated in the same way as in Example 7 to obtain aluminum compound wherein aluminum hydroxide is combined with citric acid in the ratio of 0.03 mole of the acid relative to one atom of aluminum.

Yield: 3.7 parts by weight.
Anti-acid potency of the product is 280.

EXAMPLE 10

The same treatment as in Example 1 is carried out, employing 4 parts by weight of sodium carbonate in place of 7 parts by weight of sodium hydrogen carbonate to obtain aluminum compound wherein aluminum hydroxide is combined with gluconic acid in the ratio of 0.07 mole of the acid relative to 1 atom of aluminum.

Yield: 2.3 parts by weight.
Anti-acid potency of the product is 305.

EXAMPLE 11

To a solution prepared by dissolving 11.86 parts by weight of alum in 50 parts by volume of water is added 2.92 parts by volume of 10% aqueous solution of gluconic acid, which is added with stirring to an aqueous solution of 7 parts by weight of sodium hydrogen carbonate in 80 parts by volume of water to obtain a precipitate. After being washed with water, the precipitate is dried in the same way as in Example 1 to obtain aluminum compound wherein aluminum hydroxide is combined with gluconic acid in the ratio of 0.06 mole of the acid relative to one atom aluminum.

Yield: 2.2 parts by weight.
Anti-acid potency of the product is 320.

EXAMPLE 12

The same treatment as in Example 11 is carried out, employing 1.95 parts by volume of 10% aqueous solution of gluconic acid in place of 2.92 parts by volume of 10% aqueous solution of gluconic acid in Example 11 to obtain aluminum compound wherein aluminum hydroxide is combined with gluconic acid in the ratio of 0.04 mole of the acid relative to 1 atom aluminum.

Yield: 2.1 parts by weight.
Anti-acid potency of the product is 319.

What is claimed is:

1. Aluminum compound wherein aluminum hydroxide is chemically combined with dibasic lower aliphatic carboxylic acid in a ratio sufficient for preventing the aging of aluminum hydroxide without engendering an undesirable effect upon controlling acidity of gastric juice, said ratio being in the range of 1/10 to 1/50 mole of the acid per atom of aluminum.

2. Aluminum compound as claimed in claim 1 wherein the dibasic lower aliphatic carboxylic acid is a member selected from the group consisting of maleic acid, malonic acid and succinic acid.

3. Aluminum compound wherein aluminum hydroxide is chemically combined with hydroxy carboxylic acid selected from the group consisting of malic acid, salicylic acid, lactic acid, tartaric acid, citric acid, gluconic acid and keto-gluconic acid in a ratio sufficient for preventing the aging of aluminum hydroxide without engendering any undesirable effect upon controlling acidity of gastric juice, said ratio being in the range of 1/10 to 1/50 mole of the acid per atom of aluminum.

4. A method for preparing aluminum compound wherein aluminum hydroxide is chemically combined with dibasic lower aliphatic carboxylic acid which comprises admixing aluminum hydroxide, dibasic lower aliphatic carboxylic acid and water, the amount of dibasic lower aliphatic carboxylic acid being sufficient for preventing the aging of aluminum hydroxide without engendering any undesirable effect upon controlling acidity of gastric juice, in the presence of water followed by conversion to dryness, said amount being in the range of 1/10 to 1/50 mole of the acid per atom of aluminum.

5. A method claimed in claim 4, wherein the dibasic lower aliphatic carboxylic acid is a member selected from the group consisting of maleic acid, malonic acid and succinic acid.

6. A method for preparing aluminum compound wherein aluminum hydroxide is chemically combined with hydroxy carboxylic acid which comprises admixing aluminum hydroxide, water and hydroxy carboxylic acid selected from the group consisting of malic acid, salicylic acid, lactic acid, tartaric acid, citric acid, gluconic acid and keto-gluconic acid, the amount of hydroxy carboxylic acid being sufficient for preventing the aging of aluminum hydroxide without engendering any undesirable effect upon controlling acidity of gastric juice, in the presence of water, followed by conversion to dryness, said amount being in the range of 1/10 to 1/50 mole of the acid per atom of aluminum.

References Cited

UNITED STATES PATENTS

| | | | |
|---|---|---|---|
| 1,447,501 | 3/1923 | Altwegg | 260—448 |
| 1,846,880 | 2/1932 | Kussmaul | 260—448 |
| 1,914,557 | 6/1933 | Craver | 260—448 XR |
| 2,042,019 | 5/1936 | Pasternack et al. | 260—448 |
| 2,275,211 | 3/1942 | Urbain et al. | 260—448 XR |
| 2,327,815 | 8/1943 | Niedercorn et al. | 260—448 |
| 2,446,981 | 8/1948 | Ninger | 260—448 XR |
| 3,047,602 | 7/1962 | Schenck | 260—448 |
| 3,155,577 | 11/1964 | Mercer et al. | 260—448 XR |
| 3,220,797 | 11/1965 | Lester | 260—448 XR |

FOREIGN PATENTS 348,789   5/1931   Great Britain.

OTHER REFERENCES

Mellor: Comprehensive Treatise on Inorg. and Theo. Chem., vol. 5, pp. 221–222 (1924).
Chemical Abstracts, vol. 40, p. 11 (1946).

TOBIAS E. LEVOW, *Primary Examiner.*

H. M. S. SNEED, *Assistant Examiner.*

U.S. Cl. X.R.

260—448; 424—317